Sept. 11, 1923.
M. ARENDT ET AL
1,467,911
HYDROGEN DETECTOR
Filed March 31, 1920
2 Sheets-Sheet 1
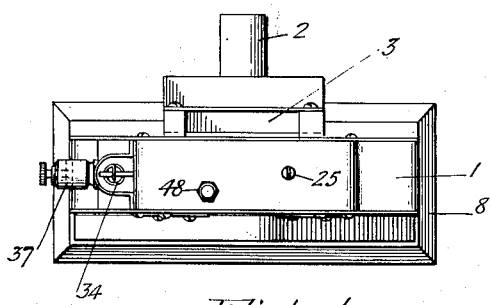
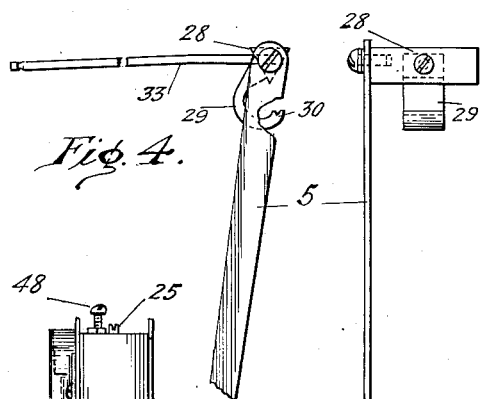
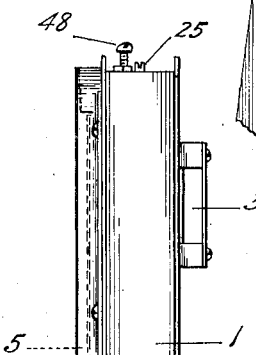
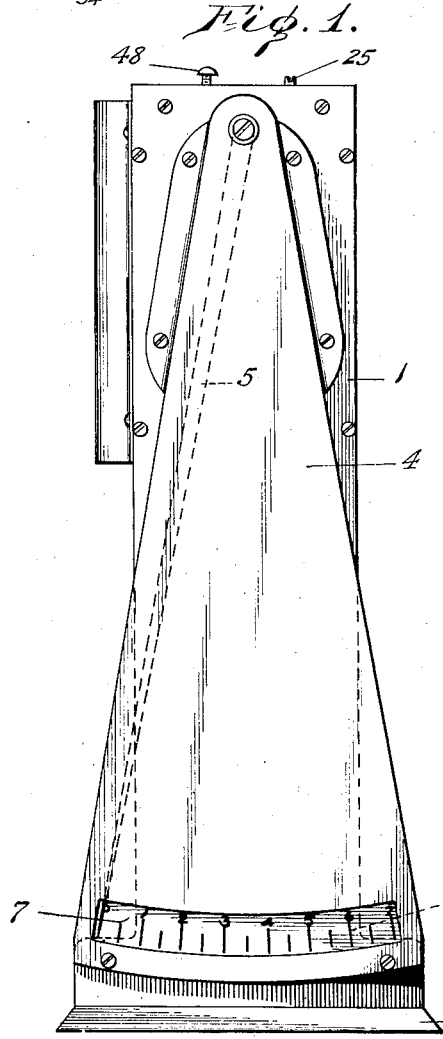
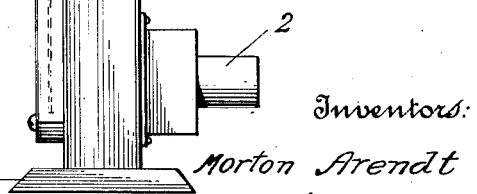
Inventors:
Morton Arendt
Edward V. Brown
By E. J. Curtis
Attorney

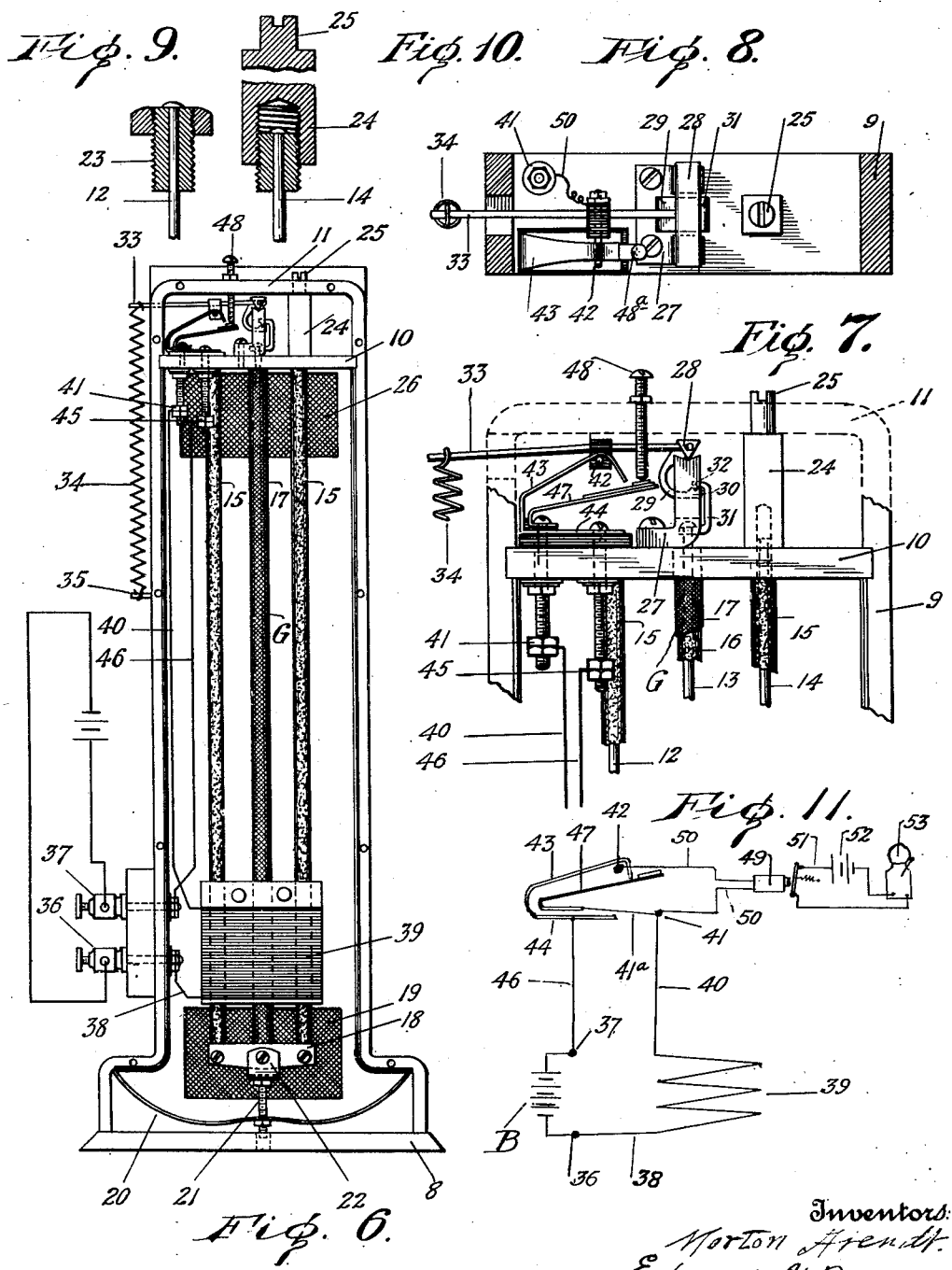

Patented Sept. 11, 1923.

1,467,911

UNITED STATES PATENT OFFICE.

MORTON ARENDT, OF NEW YORK, N. Y., AND EDWARD V. BROWN, OF NEW LONDON, CONNECTICUT.

HYDROGEN DETECTOR.

Application filed March 31, 1920. Serial No. 370,309.

*To all whom it may concern:*

Be it known that we, MORTON ARENDT, a citizen of the United States, and resident of the city, county, and State of New York, and EDWARD V. BROWN, a citizen of the United States, and resident of New London, in the county of New London and State of Connecticut, have invented certain new and useful Improvements in Hydrogen Detectors, of which the following is a specification.

This invention is an apparatus designed to detect the presence of a gas, such as hydrogen, and to provide means to indicate the percentage of such gas as may be present.

While its adaptation is varied, it is particularly useful in mines, and in vessels employing storage batteries, such as a submarine vessel, wherein the charging of the storage batteries will produce hydrogen gas. Unless this gas is promptly detected, its presence may produce an explosive mixture with the air, if confined, which, should it come into contact with a spark, open flame, or incandescent material, would endanger the lives of persons as well as result in the probable destruction of property.

The object of the invention is to provide an apparatus which will give a direct reading of the percentage of gas present, the operation of the device being continuous and automatic, and independent of atmospheric conditions, although capable of being manually adjusted to varying conditions of service.

A further purpose of the invention is to produce a signal or alarm should the gas be present in such quantity as to be considered dangerous to life or property.

The invention utilizes an instrument having an element sensitive to the presence of hydrogen gas, which element may include as a part thereof, finely divided substances forming catalytic bodies.

It is a well-known fact that certain metals, usually referred to as catalysts, represented by platinum, vanadium, palladium, and the like, particularly when in finely divided condition, have the property of generating heat when in contact with gases, such as hydrogen, and the principle of this invention makes use of such catalytic bodies.

The invention embodies an apparatus or instrument interposed in an electric circuit, the instrument having an element which is sensitive to the presence and action of a gas, and which, when in the presence of such gas, will undergo physical changes and actuate other instrumentalities with which may be associated indicating or registering devices. The apparatus may be so organized that the physical changes of the sensitized element will be capable of affecting the relation of the members within the circuit, such as an automatic electric switching means and a relay, or other equivalent mechanism, that a signal may be produced when a predetermined amount of gas is present.

When the sensitive element is liable to be affected by changes in temperature, whether produced by the presence of a gas or by atmospheric changes, means are provided to compensate for such changes as are not due to the presence of a gas, such as hydrogen. Moreover, this compensating mechanism may be susceptible to various manual adjustments to adapt the instrument to the conditions under which it would be required to operate.

Generally stated, the invention comprises a frame carrying a plurality of connected elements provided with manual means for their adjustment, and an equalizing member for said connected elements, one of said elements being formed of material sensitive to the action of a gas. An electric switching means is operatively connected with the sensitive element to control a signal device, to actuate an indicator and to control the operation of an electric heater. This heater is employed to nullify the effects of atmospheric conditions on the plurality of connected elements. The heater serves to maintain all of said elements at a predetermined temperature, thereby precluding atmospheric temperature changes from affecting said elements individually, and at the same time permitting the gas-sensitive element to elongate independently of its companion elements when acted upon by a gas. The longitudinal movement, due to expansion and contraction, of the gas-sensitive element serves to operate the switching means and the indicator.

While the invention is susceptible to various constructions, one practical form of device and its arrangement in connection with an electric circuit with its associated instrumentalities is disclosed in the accompanying drawings, but it is to be understood that the disclosure therein made does not define the limits of the invention.

In the drawings—

Fig. 1 is a front elevation of the detector illustrating the scale and indicator hand.

Fig. 2 is a side elevation disclosing the gas inlet and outlet ports.

Fig. 3 is a plan view of the structure shown in Fig. 1.

Figs. 4 and 5 are enlarged detail views of the indicator hand mounted on its pivoted member, showing the switch-controlling lever.

Fig. 6 is a front elevation of the frame with cover removed.

Fig. 7 is an enlarged detail view disclosing the pivoted members which cooperate with the gas-sensitive element, the electric switching means and a manual adjusting screw for a wire of the compensating device.

Fig. 8 is a plan view of the structure of Fig. 7.

Figs. 9 and 10 are detail views of the means of connecting the supporting wires of the atmospheric compensating device to the cross-head of the frame; Fig. 10 serving as the screw for the manual adjustment of the instrument to position the indicator hand.

Fig. 11 is a diagrammatic view of an electric circuit to operate a signal for the device.

Referring more particularly to the embodiment of the invention disclosed in the accompanying drawings, there is shown a casing 1 which may be of any desired material and provided with a gas inlet port 2 and a gas exit port 3. In Figs 2 and 3 these ports are disclosed at the rear of the casing 1. The casing is shown having a triangular section 4 serving as a protection for a pivotally movable indicator hand 5, which cooperates with a scale 6 having a transparent window 7. The casing 1 may have a supporting base 8 or may be mounted in any other suitable or desirable manner.

Within the casing 1 there is mounted a frame 9 of any suitable form, said frame being shown mounted on the base 8. This frame may be provided with a cross strut 10 near its upper end, and this upper end of the frame may be closed by a cross member 11. Within the frame 9 there is shown mounted a plurality of vertical elements, three of which are illustrated in Figs. 6 and 7. As disclosed in the drawings, these vertical elements are each provided with a metallic core, and in practice it is found that these core members should be of a material having a large co-efficient of expansion, of high elastic limit and not easily corroded. One substance which is found suitable for this purpose is "liberty silver", sometimes known as "German silver". These metallic core members are indicated by the reference characters 12, 13, and 14, the members 12 and 14 being shown surrounded by asbestos indicated at 15, although it is to be understood that other protecting materials may be employed if found desirable. The central core member 13 is preferably surrounded by a composition of asbestos and palladium, and one form of such composition which has been found of practical value is what will be hereinafter termed as palladinized asbestos, which may be a 5% composition of palladium and asbestos, the core member 13 being surrounded by finely divided substances forming catalytic bodies indicated at 16 in Fig. 7. This surrounding substance may be retained in position around the core member 13 by thin metallic tubular gauze indicated at 17. Core members 12, 13 and 14 are connected to a cross-head 18, shown in Fig. 6, which cross-head is positioned in alignment with the gas inlet port 2, which may be provided with a screen indicated at 19. This cross-head 18 is shown connected with an equalizing spring 20 mounted in the frame 9 by means of a manual adjusting screw 21 mounted on a pivotal link 22. Core member 12 is adjustably secured to cross-strut 10 by a threaded element 23 shown more clearly in Fig. 9. Core member 14 is shown mounted in strut 10 for adjustment of the equalizing mechanism by means of the manual adjusting screw 24, the end 25 of which is shown protruding through the frame 1 in Figs. 1 and 2. This adjusting screw 24 may be of any desired form, and its function is to regulate the position of the indicator hand 5 with relation to the zero point, or any other predetermined point, of the scale 6 during the operation of the instrument. The upper end of the frame is shown provided with a metallic screen 26 for the exit port 3 of the casing 1. This exit port 26 is positioned near the upper end of the vertical elements formed by the core members 12, 13 and 14.

The vertical element indicated by the characters 13, 16 and 17, will be hereinafter referred to as a gas-sensitive element for the reason that when the core member 13 is associated with the palladinized asbestos 16, this element will be sensitive to the presence of a gas, such as hydrogen, which will serve to heat core member 13 and affect the action of said member separately from any action that may take effect in core member 12 and 14, due to atmospheric changes or artificial heating.

For the purpose of convenience, this gas-sensitive element when hereinafter referred to as a composite member will be designated by the letter G. This element G while connected to the cross-head 18 at one end is not connected to the strut 10 at its other end, as is the case with its associated core member 12 and 14, but is freely movable with reference to the frame 9 and strut 10, its movement, in the embodiment disclosed in the drawing being in a longitudinal direction.

Mounted upon strut 10 is shown an angular supporting block 27, which serves as a pivotal mounting for a pivot block 28, having a depending arcuate arm 29 which terminates in a pivotal supporting end 30. A link which is shown angular in form and indicated at 31 may serve to connect this pivotal arcuate arm 29 with the core member 13 of the gas-sensitive element G. The link 31, which may be loosely connected with the core member 13, is preferably supported at 32 upon the end 30 of arm 29, the pivotal connections at 28 and 32 being preferably of a knife-edged type. Connected with the pivot block 28 is a lever arm 33, which is shown extending beyond the side of the frame 9, to connect with a spring 34, the other end of which spring 34 is connected to a pin 35, the spring serving to maintain the link members 29 and 31 in operative position during the normal condition of the instrument. Connected with the pivot block 28 is the indicator hand 5, and in Figs. 4 and 5 this hand is shown as detachably mounted on the block 28 and so secured thereto as to indicate any movement by this block on the scale 6. By this arrangement, any longitudinal movement of the gas-sensitive element G, caused by the presence of hydrogen gas being absorbed by the palladinized asbestos to heat and expand, or extend the core element 13, will serve to permit the movement of such core member, through link 31 and arm 29, to be transmitted to the pivotal block 28, which movement will be registered on the scale by the indicator hand.

To nullify the effects of atmospheric conditions on the plurality of connected elements 15 and 17, there is employed a heater 39 shown in the drawings as an electric heater, which serves to maintain all of the core members 12, 13 and 14 at a predetermined temperature, thereby precluding atmospheric temperature changes and conditions from affecting the core members. This heater may be employed to heat these core members to any suitable degree, for example, to a degree beyond that found in ordinary atmospheric conditions, and at the same time maintain the covering or surrounding material for said core members in a dry condition.

Any desired electric circuiting for the heating system may be employed, and one form of such system is disclosed in diagrammatic form in Fig. 11, which will be more particularly referred to hereinafter.

Binding posts 36 and 37 are provided on the frame 9, and a wire 38 connects binding post 36 to the heater indicated at 39. A wire 40 connects the heater with a terminal 41 which is operatively connected with the insulated contact 42 carried by lever 33. This contact 42 is adapted to contact with a contact spring 43, which spring has an extension 44 connecting with terminal 45, with which is connected wire 46 leading to binding post 37. This spring 43 is shown provided with a resilient stop plate 47, which is insulated from the member 43 in any suitable manner. The position of this top plate 47 with relation to the spring 43 may be adjusted by the screw 48. It will be noted that screw 48 is mounted in cross member 11 of frame 9 and is shown in contact with the free end of the resilient stop plate 47. The adjustment of this screw 48 serves to so position the stop plate 47 with relation to contact spring member 43 that any predetermined danger point may be indicated by a signal and also by an indicator, both being independently operated by the gas-sensitive element G. The extension of element G serves to elevate link 31 and permit arm 29 to move slightly to the right. This movement causes the pivot block 28 to rock on its knife-edge, thereby moving the indicator hand 5 and at the same time permitting lever 33 to move downwardly until the end of spring contact 43 engages stop plate 47. This engagement point can be determined by the adjustment of the screw 48, as previously stated, and which adjustment can be made, if desired, to form a contact when the connection between rod 42 and spring 43 is broken by the movement of lever 33. Plate 47 may be connected by a jumper 41ᵃ to terminal 41 to cut out the circuit through rod 42 when the spring 43 engages plate 47, and will so operate in the event rod 42 is not actually out of contact with spring 43, thereby operating the signal.

In the circuit arranged as disclosed in Fig. 11, contact rod 42 remains into engagement with contact spring 43 when the gas-sensitive element G is not affected by a gas. When so connected the current would pass from a source of supply B through post 36, wire 38, heater 39, wire 40, terminal 41, through relay 49 and wire 50 to contact rod 42, through spring 43—44, terminal 45, wire 46 to terminal 37, maintaining the operation of the heater and rendering the alarm inactive.

Should the gas-sensitive element G be so affected by the presence of a gas as to operate through members 28, 30, 31 to cause the lever 33 to move downwardly to a position to break the connection between contact rod 42 and spring 43, then the presence of gas in dangerous quantity would be recorded by the indicator. With the contact broken between 42 and 43 and formed between the end of 43 and 47, the current in the diagram of Fig. 11 would flow from the source of supply B, through post 36, wire 38, heater 39, wire 40, terminal 41, through jumper 41ª to plate 47, through spring 43—44, terminal 45, wire 46 to terminal 37, thereby maintaining the heater in operation as before. Here, however, the relay 49 would receive no current through wire 50 and would thereby close circuit through members 51, 52 and 53, sounding an alarm, indicating that gas is present in such quantity as to be dangerous to life or property.

In the structure as described in connection with the drawings, the temperature of the catalytic element would vary more rapidly than the percentage of hydrogen, and in consequence thereof the scale values indicated at 6 would not vary in value equally, but, as a uniform scale is desirable, the form of detector herein described and illustrated has a rectified scale. This has been accomplished by arranging the pivotal points 28 and 32 so that the contact of point 32 is shown positioned slightly to the right of the supporting knife-edge of block 28. This gives a short lever arm for a small percentage of gas and a progressively increased lever arm as the percentage of gas becomes greater, for the reason that as the lever arm 33 moves downward the contact point between 30 and 32 swings to the right, lengthening the projected horizontal distance between the knife-edge of block 28 and the point of contact at 32 between arm 30 and link 31.

We claim:

1. In a device of the class described, indicating mechanism, an element whose physical condition is changed by contact with a gas to actuate the indicating mechanism and a heater to prevent atmospheric changes from affecting said indicating-actuating element.

2. A device of the class described having indicating mechanism, an element sensitive in the presence of a gas to actuate the indicating mechanism, means to neutralize the effect of atmospheric changes on said element, and a signal adapted to be operated by the indicating mechanism at a predetermined point.

3. In a device of the class described, a signal, means actuated by a gas-sensitive element to operate the signal and a heater to nullify the effect of atmospheric changes on said gas-sensitive element.

4. A device of the class described, which comprises an element built-up of dissimilar materials and capable of elongation when a gas is present, means to compensate for atmospheric conditions, an indicator for the element, means actuated by said element to operate the indicator, and an electric circuit including switching instrumentalities for controlling a signal when the instrumentalities are actuated by the element.

5. A device of the class described comprising a composite element capable of physical change when in a gaseous envelope, an indicator for the element, means actuated by the physical changes in said element to operate the indicator, and switching instrumentalities including an electric circuit operable by the physical changes of said element.

6. A device of the class described comprising a plurality of elements embodying means to compensate for atmospheric conditions and including manually controlled adjusting means, one of said elements being of composite form and adapted to vary its length when enveloped by a gas independently of atmospheric conditions, and indicating and signaling means controlled by the movements of said composite element.

7. A gas indicator comprising a member affected by atmospheric temperature changes, an element sensitive to the presence of a gas cooperating with said member, and a heater common to said member and element to maintain the member and element at a substantially predetermined temperature to thereby preclude atmospheric temperature changes from affecting said member and element.

8. A gas detector comprising an indicator, an element sensitive to the presence of a gas for actuating the indicator, equalizing mechanism for the indicator comprising a support for the element and compensating members whereby the position of the indicator may be adjusted, and a heater common to said element and the compensating members to nullify the effect of atmospheric temperature changes on the element and compensating members.

9. A gas indicator comprising temperature compensating members, an element sensitive to the presence of a gas, a heater common to said members and element, and an indicating device actuated by the relative movement of said gas-sensitive element and the compensating members.

10. A gas indicator comprising a plurality of wires of a material sensitive to atmospheric temperature changes, said wires being secured at one end, expansion compensating means cooperating with said secured ends of the wires, one of said wires carrying a catalytic substance to expand the same when in the presence of a gas, and indicating devices actuated by the relative movement of said gas-sensitive wire and the compensating means.

11. A gas detector and indicator comprising wires arranged to compensate for atmospheric temperature changes, an additional wire cooperating with said temperature wires having associated therewith a substance sensitive to the action of a gas, and means actuated by the relative movement of said wires to indicate the percentage of gas present.

12. A gas indicator comprising mechanical devices to compensate for atmospheric temperature changes associated with an element having one end thereof free to move in one direction, said element carrying palladium-asbestos to render the element sensitive to the presence of a gas, and indicating devices actuated by the relative movement of the compensating devices and said element when acted upon by a gas.

13. A gas signaling device comprising mechanical members arranged to compensate for atmospheric temperature changes associated with an element carrying a substance sensitive to the presence of a gas which will elongate said element, electric switching devices adapted to be actuated by the movement of said element relative to the compensating members, and a signaling device to be operated by said electric switching devices.

14. A gas indicator comprising temperature compensating devices, an element connected with said devices having associated therewith a substance sensitive in the presence of a gas to produce physical changes in said element, and indicating instrumentalities actuated by the physical changes in said element, the movement of the element relative to the compensating devices disclosing the percentage of gas present, said indicating instrumentalities including an indicator hand and a scale.

15. A gas detector comprising a plurality of members arranged to compensate for atmospheric temperature changes, an element associated with said members sensitive in the presence of a gas to change the physical character of said element, indicating mechanism cooperating with said element and actuated by the element when changed by the presence of a gas, and manually controlled means to regulate the relative action of the atmospheric temperature changing members on said indicating mechanism.

16. A gas detector comprising a plurality of connected elements, one of which is movable independent of the remaining elements and is sensitive to the action of a gas, said elements embodying a temperature compensating device, indicating means, and coacting pivoted members cooperating with said gas-sensitive element and the indicator to transmit movement from the gas-sensitive element to the indicator.

17. A gas indicator including a catalytic element capable of longitudinal movement when in the presence of a gas, an indicator having a hand, a pivoted member connected to said hand, and a link carried by said catalytic element and pivotally connected with said pivot member of the hand for transmitting longitudinal movement of said element into oscillating movement of said hand.

18. In a gas detector, a catalytic element comprising a metallic core member, a covering for said core member of asbestos and palladium, and a tubular metallic fabric to maintain the asbestos and palladium in juxtaposition to the core member.

19. In a gas indicator, a catalytic element capable of longitudinal movement, an indicator having a hand mounted for oscillating movement, said hand being secured to a pivoted member provided with a dependent arcuate arm, a link extending from an end of said catalytic element and provided with means to pivotally connect with said arcuate arm out of vertical alignment with the pivotal point of the member carrying said arm to thereby transmit movement of said catalytic element with progressive increasing lever action through said linked members to said indicator hand.

20. In a gas indicator, a catalytic element, an indicator hand, a supporting block, an arcuate arm having a pivoted point resting upon said block, said arm extending beyond the vertical axis of said pivot point to provide a second pivot point for a link to connect said catalytic element with said arcuate arm, a lever arm extending from said pivoted part of the arcuate arm member, a resilient element connected with said lever arm, and electric switching instrumentalities cooperating with said lever arm to control the action of an electric circuit when the catalytic element and the indicator hand have reached a predetermined point.

21. In a gas indicator, a catalytic element capable of longitudinal movement, an indicator hand cooperating with a scale to register the movement of the catalytic element, means to connect said gas sensitive element with said hand to transmit longitudinal movement of said element into oscillating movement of said hand, a lever arm extending from supporting means for said indicator hand, electric switching instrumentalities adapted to be operated by the movement of said lever arm, and a signaling device connected with said electric switching instrumentalities to be actuated when the indicator hand is moved to a predetermined position by the catalytic element.

22. In a gas detector, a plurality of connected elements provided with a resilient member common to said elements for equalizing the movement of said elements, an electric heater common to each of said elements, electric switching means connected with said heater, one of said elements carrying a substance which will heat said element when in the presence of a gas in addition to the heat generated by the electric heater, means to connect said gas-sensitive element with the electric switching instrumentalities, and an electric signaling device adapted to be operated when the gas-sensitive element has moved the electric switching instrumentalities into a predetermined position.

23. In a gas indicator, a plurality of elements in the form of wires having a high coefficient of expansion, an asbestos covering for said wires, a heater common to said covered wire elements, one of said elements carrying a gas absorbing substance in addition to the asbestos for the purpose of heating said wire when in the presence of a gas in addition to the heat applied to said wire by the electric heater, and means to connect said gas-sensitive element with an indicator hand to disclose the movement of said gas-sensitive element when in the presence of a gas.

24. A gas indicator comprising a plurality of connected elements having a resilient equalizer provided with a pivoted adjusting element, one of said elements being in the form of an extensible metallic member surrounded by palladinized asbestos, means to maintain said palladinized asbestos adjacent to said metallic member for the purpose of heating said metallic member when in the presence of hydrogen gas, a suspended pivot-link member cooperating with said metallic member, an indicator hand connected with said link member to transmit the movement of said metallic member, due to the heating thereof to said indicator hand, and manual adjusting means for said other connected elements to set the indicator hand at a predetermined point during the absence of hydrogen gas.

25. In a gas indicator, a catalytic element capable of movement when in the presence of a gas, a pivoted member for an indicated hand, means to transmit the movement of the catalytic element to the indicator hand, a lever connected to said pivoted member, a plurality of cooperating electric switching members adjacent said lever, a terminal carried by said lever to cooperate with one of said members, and an electric signaling device adapted to be actuated when said lever is moved by the action of the catalytic element to separate its terminal from one of said switching members.

26. A gas indicator comprising a plurality of connected elements which are provided with manual adjusting means, an atmospheric equalizing member for said elements, one of said elements being formed of material sensitive to the action of hydrogen gas, and movable independently of its companion elements, a heater common to said elements, electric switching means connected with said heater and serving to control the action of a signal, an indicator, and means to transmit the movement of the gas-sensitive element to the indicator and to the switching means.

27. A gas indicator comprising a plurality of connected elements, an atmospheric equalizing device for said elements, an electric heater common to said elements, one of said elements including palladinized asbestos to heat the element when in the presence of hydrogen gas in addition to the heat from the electric heater, said gas-sensitive element being capable of movement independently of its companion elements, electric switching means connected with said heater and serving also to control the action of a signal, pivotal members linking said gas-sensitive element to said switching means, an indicator hand connected with one of the pivotal members for movement by the gas-sensitive element, and manual adjusting means cooperating with said equalizer through one of said elements for positioning the indicator hand at a predetermined point irrespective of the action of the gas-sensitive element.

28. In a device of the class described, an indicator hand, an extensible gas-sensitive element actuating means to move the hand by the longitudinal movement of said element, an electric circuit, and an electric signal device operable by the movement of said element when in the presence of a gas and when the indicator hand-operating means assumes a position to close the electric circuit.

29. In a device of the class described, indicating instrumentalities including an indicator hand, an extensible element sensitive in the presence of a gas to actuate said indicating instrumentalities and move said hand within a predetermined range, an electric circuit, an electric signaling system within said circuit, and means actuated by the further movement of said gas-sensitive element to operate said signaling system and said indicator hand, simultaneously and independently beyond the aforesaid indicator range.

30. In a device of the class described, a gas detector having means to compensate for atmospheric conditions, a part of said means including a catalytic element, indicating means actuated by the catalytic element and having a manually controlled device for the adjustment of the range of action of its said indicator, an electric circuit having a signaling system to be actuated by the movement of said catalytic element at a predetermined point in the range of said indicator, the catalytic element operating the signal and indicator simultaneously beyond a predetermined point, said indicator being adapted to function at all times independently of the signal.

31. A gas detector comprising a frame, a catalytic element mounted on the frame and capable of movement when in the presence of a gas, a case for said frame, a scale carried by the case, an indicator hand movable relative to the case and said scale, linked devices for transmitting the movement of the catalytic element to said hand, and admission and exit ports in said casing to permit gas to have access to said catalytic element.

MORTON ARENDT,
EDWARD V. BROWN.